March 8, 1938. G. E. KELLOGG 2,110,768

CERTIFICATE HOLDER

Filed March 10, 1937

INVENTOR.
G. E. KELLOGG
BY M. Talbert Dick
ATTORNEY.

Patented Mar. 8, 1938

2,110,768

UNITED STATES PATENT OFFICE 2,110,768

CERTIFICATE HOLDER

Glenn E. Kellogg, Des Moines, Iowa

Application March 10, 1937, Serial No. 130,024

2 Claims. (Cl. 40—10)

The principal object of my invention is to provide a certificate or like holder for use in connection with an automotive vehicle for the displaying of certificates or identification cards that complies with all vehicular laws and is easily and quickly attached to or detached from the glass of an automotive vehicle.

A further object of my invention is to provide a certificate holder that may be secured to the glass of the vehicle in any desired position within the automotive vehicle.

A still further object of this invention is to provide a certificate or like holder for holding an automobile license, certificates, driver's license, etc., that permits the information being held by the holder to be easily viewed from a position from outside the vehicle and which may at the same time keep that portion of the glass through which the certificate or like is viewed free from condensate.

A still further object of my invention is to provide a simple, compact, readily visible certificate holder for use in vehicles, such as automobiles, trucks and the like and in fact, adjacent any glass or transparent surface without in any way damaging the vehicle or the surface to which it is attached.

A still further object of my invention is to provide a certificate or like holder that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Fig. 2 is a longitudinal sectional view of my certificate holder mounted on a windshield or the like.

Most of the States have vehicle laws requiring the permanent displaying of an automobile certificate or driver's license in such a position that it may be easily inspected by anyone desiring information about the automobile. Although there are several certificate holders on the market for vehicles, particularly automobiles, none of these meet the requirements of the law in that they are not readily visible at all times. These certificate holders usually mount on the steering column of the car or are secured to the instrument panel and, due to frost and the turning of the certificate holder about the column, they are hard if not impossible to see. When the car is locked the only way to ascertain the identity of the driver is through the checking of the records for the license number of the vehicle. These certificate holders have been objected to by the law enforcement agencies because of the difficulty in identifying the owner and driver of an automotive vehicle. I have overcome these disadvantages as will be appreciated and as hereinafter more fully set forth.

Figure 1:
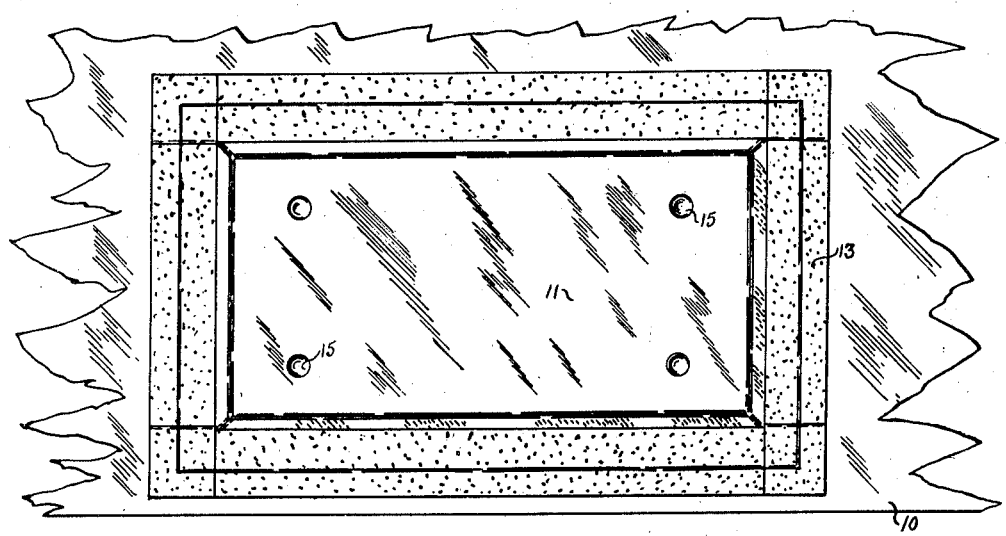
Fig. 1 is a rear plan view of my certificate holder installed on the windshield or on one of the windows of a vehicle.
Figure 2:
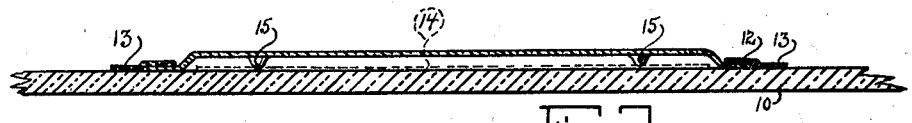
Figure 3:
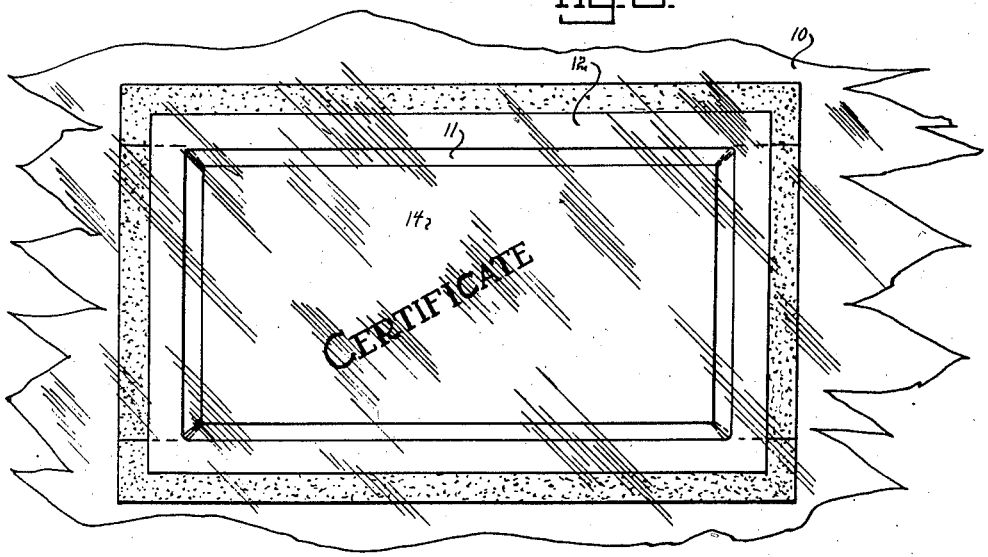
Fig. 3 is a front view of my holder with the certificate in place as seen through the window glass of the vehicle.

Referring to the drawing, I have used the numeral 10 to designate one of the window glasses of a vehicle. It is to this glass that I attach my certificate holder as will be explained. The numeral 11 designates the receptacle portion of my device which is recessed or depressed as shown in the drawing, and is formed of transparent material such as celluloid or the like. This receptacle 11 has the outwardly extending flange 12 about its edge which normally contacts the glass 10. The numeral 13 designates weatherproof tape which seals and holds the flange 12 of the holder, preventing air from entering the receptacle 11 when it is in place on the window. In use, a certificate or other identification means 14 is placed within the receptacle 11. The numeral 15 indicates a plurality of inwardly extending indentations in the surface of the receptacle which serve several functions in that they hold the certificate adjacent the glass as shown by dotted lines in Fig. 1, and add to the rigidity of the receptacle.

The practical operation of my device is as follows: The certificate or other indicia means 14 is placed within the receptacle 11 so that the identification is toward the glass 10. The flange 12 is then placed adjacent the window glass 10 within the driver's compartment of the vehicle and the tape 13 is then put in place so that it seals about the flange 12 and holds the device to the glass. This tape also seals the device, preventing air from entering the receptacle 11 and thereby preventing the inside frosting or sweating of that portion of the glass under the certificate holder. My device may be placed on any of the windows of the vehicle, preferably either the windshield or the rear window where it would not obstruct visibility.

Thus it will be seen that my improved certificate holder would meet all the requirements of vehicle laws and save needless expense and trouble because the certificate is always visible.

Although I have described my device for use in vehicles, it may be found to be of great utility in other fields such as holding various types of printed matter adjacent windows so that it may be visible even when the window is frosted.

Obviously, an air tight adhesive may be spread on the glass contacting surface of the flange 12 in place of using the tape 13.

Some changes may be made in the construction and arrangement of my improved certificate holder without departing from the real spirit and purpose of my invention, and it is my intention to cover by my claims any modified forms of structure or use of mechanical equivalents which may be reasonably included within their scope.

I claim:

1. In combination with the windshield of an automotive vehicle, a certificate holder comprising, a rectangular cellulosic transparent sheet member, a rectangular depressed portion in said sheet member for holding a certificate, protrusions formed in said sheet member and extending into said depressed portion, and adhesive strip members engaging the outer marginal side edges of said transparent sheet member and said windshield for holding said transparent sheet member to said windshield; said certificate being supported within said depressed portion of said transparent sheet member and against the glass of the vehicle by virtue of said protrusions.

2. In combination with the windshield of an automotive vehicle, a certificate holder comprising, a rectangular cellulosic transparent sheet member, a rectangular depressed portion in said sheet member for holding a certificate, protrusions formed in said sheet member and extending into said depressed portion, and a means for securing the marginal edges of said transparent sheet member to said windshield; said certificate being supported within said depressed portion of said transparent sheet member and against the glass of the vehicle by virtue of said protrusions.

GLENN E. KELLOGG.